US012149065B2

(12) United States Patent
Jha et al.

(10) Patent No.: US 12,149,065 B2
(45) Date of Patent: Nov. 19, 2024

(54) OVER VOLTAGE PROTECTION FOR A WIRELESS POWER TRANSFER SYSTEM

(71) Applicant: GE Intellectual Property Licensing, LLC, Niskayuna, NY (US)

(72) Inventors: Kapil Jha, Bangalore (IN); Arvind Kumar Tiwari, Bangalore (IN); Yash Veer Singh, Bangalore (IN); Olive Ray, Bangalore (IN)

(73) Assignee: General Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 16/884,338

(22) Filed: May 27, 2020

(65) Prior Publication Data

US 2020/0287375 A1 Sep. 10, 2020

Related U.S. Application Data

(63) Continuation of application No. 15/717,855, filed on Sep. 27, 2017, now Pat. No. 10,700,510.

(30) Foreign Application Priority Data

Sep. 30, 2016 (IN) .............................. 201641033404

(51) Int. Cl.
*H02H 3/20* (2006.01)
*H02H 1/00* (2006.01)
(Continued)

(52) U.S. Cl.
CPC ............ *H02H 3/20* (2013.01); *H02H 1/0007* (2013.01); *H02H 7/22* (2013.01); *H02J 50/10* (2016.02);
(Continued)

(58) Field of Classification Search
CPC . H02J 50/10; H02J 50/80; H02J 50/90; B60L 53/12; H02H 3/023; H02H 3/20;
(Continued)

(56) References Cited

U.S. PATENT DOCUMENTS 6,037,745 A 3/2000 Koike et al.
7,595,569 B2 9/2009 Ameron et al.
(Continued)

FOREIGN PATENT DOCUMENTS

CN 104079079 10/2014
CN 104795903 7/2015
(Continued)

OTHER PUBLICATIONS

"Qi System Description Wireless Power Transfer", Wireless Power Consortium, vol. 1:Low Power, Part 1:Interface Definition, Version 1.0.1, Oct. 2010, 88 pages.
(Continued)

*Primary Examiner* — Michael R. Fin
(74) *Attorney, Agent, or Firm* — DeLizio, Peacock, Lewin & Guerra, LLP (57) ABSTRACT

A wireless power transfer system is disclosed. The wireless power transfer system includes a first converting unit configured to convert a first DC voltage of an input power to an AC voltage. Further, the wireless power transfer system includes a contactless power transfer unit configured to transmit the input power having the AC voltage. Also, the wireless power transfer system includes a second converting unit configured to convert the AC voltage to a second DC voltage and transmit the input power having the second DC voltage to an electric load. Additionally, the wireless power transfer system includes a switching unit configured to decouple the electric load from the contactless power trans-
(Continued)

fer unit if the second DC voltage across the electric load is greater than a first threshold value.

26 Claims, 6 Drawing Sheets

(51) Int. Cl.
*H02H 7/22* (2006.01)
*H02J 50/10* (2016.01)
*H02J 50/12* (2016.01)
*H02J 50/80* (2016.01)
*H02M 3/335* (2006.01)

(52) U.S. Cl.
CPC ............ *H02J 50/80* (2016.02); *H02M 3/335* (2013.01); *H02J 50/12* (2016.02); *H02M 3/33576* (2013.01)

(58) Field of Classification Search
CPC ........ H02H 9/041; H02H 1/0007; H02H 7/22; H02M 3/335
USPC .............................................. 307/104; 361/86
See application file for complete search history.

(56) References Cited

U.S. PATENT DOCUMENTS

| | | |
|---|---|---|
| 8,004,235 B2 | 8/2011 | Baarman et al. |
| 8,060,011 B2 | 11/2011 | Mikimoto |
| 8,129,864 B2 | 3/2012 | Baarman et al. |
| 8,232,829 B2 | 7/2012 | Robinson, III |
| 8,929,043 B2 | 1/2015 | Kim et al. |
| 9,124,113 B2 * | 9/2015 | Hu ........................ H02J 50/10 |
| 9,153,998 B2 | 10/2015 | Mayo |
| 9,269,489 B2 | 2/2016 | Wu et al. |
| 10,236,720 B2 | 3/2019 | Moon et al. |
| 10,263,472 B2 | 4/2019 | Sugiyama et al. |
| 10,381,877 B2 | 8/2019 | Su |
| 10,601,248 B2 * | 3/2020 | Zhang .................... H01F 38/14 |
| 10,673,275 B2 * | 6/2020 | Jha ......................... H02J 50/10 |
| 10,700,510 B2 | 6/2020 | Jha et al. |
| 10,700,550 B2 * | 6/2020 | Jha ......................... B60L 53/12 |
| 11,394,239 B2 | 7/2022 | Jha et al. |
| 11,949,240 B2 | 4/2024 | Jha et al. |
| 2008/0068868 A1 | 3/2008 | Williams |
| 2009/0096413 A1 | 4/2009 | Partovi et al. |
| 2010/0109445 A1 | 5/2010 | Kurs et al. |
| 2010/0110741 A1 | 5/2010 | Lin et al. |
| 2011/0285349 A1 | 11/2011 | Widmer et al. |
| 2012/0306286 A1 | 12/2012 | Kim et al. |
| 2013/0176653 A1 | 7/2013 | Kim et al. |
| 2013/0214611 A1 | 8/2013 | Bae |
| 2013/0271069 A1 | 10/2013 | Partovi |
| 2014/0152114 A1 * | 6/2014 | Kim ...................... H04B 5/0037 307/104 |
| 2014/0346888 A1 * | 11/2014 | Kim ....................... H02J 50/80 307/104 |
| 2014/0361628 A1 | 12/2014 | Huang et al. |
| 2015/0035374 A1 | 2/2015 | Park et al. |
| 2015/0051109 A1 | 2/2015 | Berdondini et al. |
| 2015/0054349 A1 | 2/2015 | Ishikuro et al. |
| 2015/0084428 A1 | 3/2015 | Moon et al. |
| 2015/0137611 A1 | 5/2015 | Huang et al. |
| 2015/0229139 A1 | 8/2015 | Greene |
| 2015/0229225 A1 | 8/2015 | Jang et al. |
| 2015/0263511 A1 | 9/2015 | Sandner et al. |
| 2015/0280455 A1 * | 10/2015 | Bosshard ............. B60L 53/126 307/104 |
| 2015/0326143 A1 | 11/2015 | Petras et al. |
| 2015/0341087 A1 | 11/2015 | Moore et al. |
| 2015/0349538 A1 * | 12/2015 | Agostinelli .......... H04B 5/0081 307/104 |
| 2015/0372622 A1 | 12/2015 | Ortiz |
| 2016/0006356 A1 | 1/2016 | Nirantare et al. |
| 2016/0013663 A1 | 1/2016 | Zhang et al. |
| 2016/0072398 A1 | 3/2016 | Deboy |
| 2016/0214488 A1 * | 7/2016 | Okamoto ................ H02J 7/025 |
| 2016/0254659 A1 | 9/2016 | Chambon et al. |
| 2017/0025885 A1 | 1/2017 | Blakely et al. |
| 2017/0063161 A1 * | 3/2017 | Sugiyama ............... H02J 50/80 |
| 2017/0093225 A1 | 3/2017 | Murayama et al. |
| 2017/0104368 A1 | 4/2017 | Radke et al. |
| 2017/0207657 A1 * | 7/2017 | Kotani .............. H02J 7/007184 |
| 2017/0222479 A1 | 8/2017 | Jha et al. |
| 2017/0222480 A1 | 8/2017 | Jha et al. |
| 2017/0317524 A1 | 11/2017 | Yim |
| 2018/0090995 A1 | 3/2018 | Arasaki et al. |
| 2018/0097351 A1 | 4/2018 | Jha et al. |
| 2018/0287500 A1 * | 10/2018 | Tsutsui ................ H02M 3/1588 |
| 2020/0251931 A1 | 8/2020 | Jha et al. |
| 2020/0287418 A1 | 9/2020 | Jha et al. |
| 2022/0344974 A1 | 10/2022 | Jha et al. |

FOREIGN PATENT DOCUMENTS

| | | |
|---|---|---|
| CN | 105493375 | 4/2016 |
| EP | 2632014 | 8/2013 |
| EP | 2928038 | 10/2015 |
| EP | 2985846 | 2/2016 |
| EP | 3046220 | 7/2016 |
| EP | 3203605 | 8/2017 |
| EP | 3203606 | 8/2017 |
| JP | 2006074848 | 3/2006 |
| JP | 2014171278 | 9/2014 |
| JP | 2015089267 | 5/2015 |
| WO | 2012091209 | 7/2012 |
| WO | 2013042570 | 3/2013 |
| WO | 2015037949 | 3/2015 |
| WO | 2015115285 | 8/2015 |

OTHER PUBLICATIONS

"U.S. Appl. No. 15/717,855 Office Action", Nov. 13, 2019, 13 pages.
"U.S. Appl. No. 15/717,855 Office Action", May 2, 2019, 19 pages.
Cheng, et al., "Adaptive On/Off Delay-Compensated Active Rectifiers for Wireless Power Transfer Systems", IEEE Journal of Solid-Slate Circuits, vol. 51, Issue: 3, pp. 712-723, Mar. 2016, 12 pages.
Jang, et al., "New Soft-Switched Contactless Battery Charger With Robust Local Controllers", IEICE/IEEE MTELEC'03, Oct. 19-23, 2003, pp. 473-479, Oct. 19-23, 2003, 7 pages.
Sun, et al., "A High Speed Comparator Based Active Rectifier for Wireless Power Transfer Systems", Intelligent Radio for Future Personal Terminals {IMWS-IRFPT), 2011 IEEE MTI-S International Microwave Workshop Series, Aug. 24-25, 2011, 2 pages.
"India Application No. 10-2016-41033404 First Examination Report", Feb. 7, 2019, 6 pages.
"Chinese Application No. 201710063931 First Office Action", Mar. 4, 2021, 14 pages.
"Chinese Application No. 201710063932.4 First Office Action", Feb. 26, 2021, 15 pages.
"Co-pending India Application No. 201641003928, filed Feb. 3, 2016, 41 pages", 41 pages.
"Co-pending India Application No. 201641003929, filed Feb. 3, 2016, 38 pages", 38 pages.
"European Application No. 17153732.7 European Search Report and Opinion", Jun. 8, 2017, 9 pages.
"European Application No. 17153732.7 Communication pursuant to Article 94(3) EPC", Nov. 29, 2018, 6 pages.
"European Application No. 17153808.5 Communication pursuant to Article 94(3) EPC", Dec. 14, 2018, 6 pages.
"European Application No. 17153808.5 European Search Report and Opinion", Jun. 7, 2017, 10 pages.
"European Application No. 20175824.0 Communication pursuant to Article 94(3) EPC", Nov. 30, 2020, 7 pages.
"Japanese Application No. 2017-013768 Notification of Reason for Refusal", Dec. 25, 2020, 3 pages.

(56) References Cited

OTHER PUBLICATIONS

"Japanese Application No. 2017-013769 Notification of Reason for Refusal", Dec. 25, 2020, 3 pages.
"The Qi Wireless Power Transfer Power Class 0 Specification", Qi Wireless Power Consortium, Parts 1 and 2: Interface Definitions, Version 1.2.2, Apr. 2016, 160 pages.
"THE Qi Wireless Power Transfer Power Class 0 Specification", Qi Wireless Power Consortium, Part 4: Reference Designs, Version 1.2.2, Apr. 2016, 310 pages.
"U.S. Appl. No. 15/417,246 Office Action", Nov. 13, 2019, 22 pages.
"U.S. Appl. No. 15/417,246 Office Action", Apr. 18, 2019, 19 pages.
"U.S. Appl. No. 15/420,139 Final Office Action", Apr. 22, 2019, 15 pages.
"U.S. Appl. No. 15/420,139 Office Action", Sep. 28, 2018, 10 pages.
"U.S. Appl. No. 16/880,712 Office Action", May 3, 2021, 8 pages.
De Silva, et al., "The Package Integration of RF-MEMS Switch and Control IC for Wireless Applications", IEEE Transactions on Advanced Packaging, vol. 26, No. 3, pp. 255-260 (Aug. 2003), Aug. 2003, 6 pages.
Jha, et al., "System and Method for Protecting a Wireless Power Transfer System", GE Co-Pending Application No. 201641003928, GE Docket No. 258990-1, filed on Feb. 3, 2016, 40 pages.
Jha, et al., "System and Method for Protecting a Wireless Power Transfer System", GE Co-Pending Application No. 201641003929, GE Docket No. 285990A-1, Feb. 3, 2016, 37 Pages.
Trivino-Cabrera, et al., "Independent Primary-Side Controller Applied To Wireless Chargers for Electric Vehicles", IEEE International Electric Vehicle Conference (IEVC), pp. 1-5, (Dec. 17-19, 2014), Dec. 2014, 5 pages.
"Chinese Application No. 201710063932.4 Second Office Action", Jul. 26, 2021, 23 pages.
"U.S. Appl. No. 16/880,712 Final Office Action", Sep. 7, 2021, 9 pages.
"Chinese Application No. 201710063932.4 Notice of Reexamination", Apr. 24, 2022, 12 pages.
"U.S. Appl. No. 16/880,712 Office Action", Jan. 25, 2022, 13 pages.
"China application No. 201710913768.1 First Office Action", Nov. 2, 2022, 22 pages.
"China application No. 201710913768.1 Decision of Rejection", May 29, 2023, 18 pages.
"U.S. Appl. No. 16/880,712 Non Final Office Action", Mar. 1, 2023, 8 pages.
"U.S. Appl. No. 16/880,712 Final Office Action", Jul. 28, 2023, 12 pages.
"India Application No. 201641033404 Hearing Notice", Aug. 4, 2022, 3 pages.
"Japanese Patent Application 2022000705 Notice of Reasons for Refusal", Sep. 30, 2022, 2 pages.
"Chinese Application No. 201710063931 Decision on Rejection", Aug. 20, 2021, 21 pages.
"Chinese Application No. 201710063931.X Notice of Reexamination", Apr. 24, 2022, 10 pages.
"European Application No. 20175824 Communication pursuant to Article 94(3) EPC", Apr. 5, 2022, 3 pages.
"Japan Divisional patent application No. 2023-089949 (from 2022-000705) Notice of Allowance", Jun. 11, 2024, 2 pages.
"Japan Patent application No. 2023-090281 First Office Action", Jun. 11, 2024, 3 pages.
"Japanese Application No. 2017-013769 Notification of Reason for Refusal", Nov. 9, 2021, 5 pages.
"Japanese Application No. 2022052669 Notice of Reasons for Refusal", Sep. 30, 2022, 2 pages.
"U.S. Appl. No. 16/855,619 Final Office Action", Jan. 7, 2022, 9 pages.
"U.S. Appl. No. 16/855,619 Office Action", Aug. 16, 2021, 12 pages.
"U.S. Appl. No. 17/810,935 Non Final Office Action", May 9, 2023, 12 pages.

* cited by examiner

OVER VOLTAGE PROTECTION FOR A WIRELESS POWER TRANSFER SYSTEM

RELATED APPLICATIONS

This application is a Continuation of and claims the priority benefit of U.S. application Ser. No. 15/717,855 filed Sep. 27, 2017 which claims the priority benefit of India Application No. 201641033404 filed Sep. 30, 2016, the disclosures of which are incorporated herein by reference.

BACKGROUND

Embodiments of the present disclosure relate generally to wireless power transfer systems and more particularly relate to over voltage protection for a wireless power transfer system.

In one or more industries, an electric vehicle or a hybrid vehicle includes one or more batteries that supply electrical power to drive the vehicle. In one example, the batteries supply energy to an electric motor to drive a shaft in the vehicle, which in turn drives the vehicle. The batteries are used for supplying the power and hence may be drained and need to be charged from an external power source.

In general, power transfer systems are widely used to transfer power from a power source to one or more electric loads, such as for example, the batteries in the vehicle. Typically, the power transfer systems may be contact based power transfer systems or contactless power transfer systems. In the contact based power transfer systems, components, such as plug, socket connectors, and wires are physically coupled to the batteries for charging the batteries. However, due to environmental impact, such connectors and wires may be damaged or corroded. Also, high currents and voltages are used for charging the batteries. Hence, establishing a physical connection between the power source and the batteries in the vehicle may involve cumbersome safety measures. Also, this power transfer system may become bulkier and heavier compared to the contactless power transfer system.

In the contactless power transfer systems, power converters are used to convert an input power to a transferrable power, which is further transmitted to the electric load, such as the batteries in the vehicle. The power converter includes switches which are operated at a particular switching frequency to convert the input power to the transferrable power. Typically, depending upon the load, the switching frequency of the power converter is changed to regulate or control an output voltage of the power transfer system. However, if the electric load is disconnected or varied, the output voltage of the power transfer system may attain a very high value in a very short time period. Such a sudden increase in the output voltage may lead to failure of operation and may also damage one or more components in the power transfer system.

Therefore, there is a need for an improved system and method for protecting the power transfer system.

SUMMARY

In accordance with one embodiment of the present disclosure, a wireless power transfer system is disclosed. The wireless power transfer system includes a first converting unit configured to convert a first DC voltage of an input power to an AC voltage. Further, the wireless power transfer system includes a contactless power transfer unit communicatively coupled to the first converting unit and configured to receive the input power having the AC voltage from the first converting unit and transmit the input power having the AC voltage. Also, the wireless power transfer system includes a second converting unit communicatively coupled to the contactless power transfer unit and configured to receive the input power having the AC voltage from the contactless power transfer unit, convert the AC voltage of the input power to a second DC voltage, and transmit the input power having the second DC voltage to an electric load. In addition, the wireless power transfer system includes a switching unit including a first switch electrically coupled in parallel to a first diode in a first branch of the second converting unit, a second switch electrically coupled in parallel to a second diode in a second branch of the second converting unit, and a controller electrically coupled to the first switch and the second switch and configured to activate the first switch and the second switch to decouple the electric load from the contactless power transfer unit if the second DC voltage across the electric load is greater than a first threshold value.

In accordance with another embodiment of the present disclosure, a method for operating a wireless power transfer system is disclosed. The method includes converting, by a first converting unit, a first DC voltage of an input power to an AC voltage. Further, the method includes receiving from the first converting unit and transmitting, by a contactless power transfer unit, the input power having the AC voltage. Also, the method includes converting, by a second converting unit, the AC voltage of the input power to a second DC voltage. In addition, the method includes transmitting the input power having the second DC voltage from the second converting unit to an electric load. Furthermore, the method includes decoupling, by a switching unit, the electric load from the contactless power transfer unit if the second DC voltage across the electric load is greater than a first threshold value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

DETAILED DESCRIPTION

As will be described in detail hereinafter, various embodiments of a system and method for protecting a wireless power transfer system are disclosed. Also, various embodiments of a system and method for regulating an output voltage of the wireless power transfer system are disclosed.

In particular, the system and method disclosed herein employ a switching unit to protect one or more components of the wireless power transfer system. More specifically, the switching unit decouples the one or more components in the system if an output voltage of the wireless power transfer system increases to an undesirable value. Further, the switching unit is configured to control the output voltage of the wireless power transfer system even if magnitude of an electric load coupled to the wireless power transfer system changes substantially.

Figure 1:
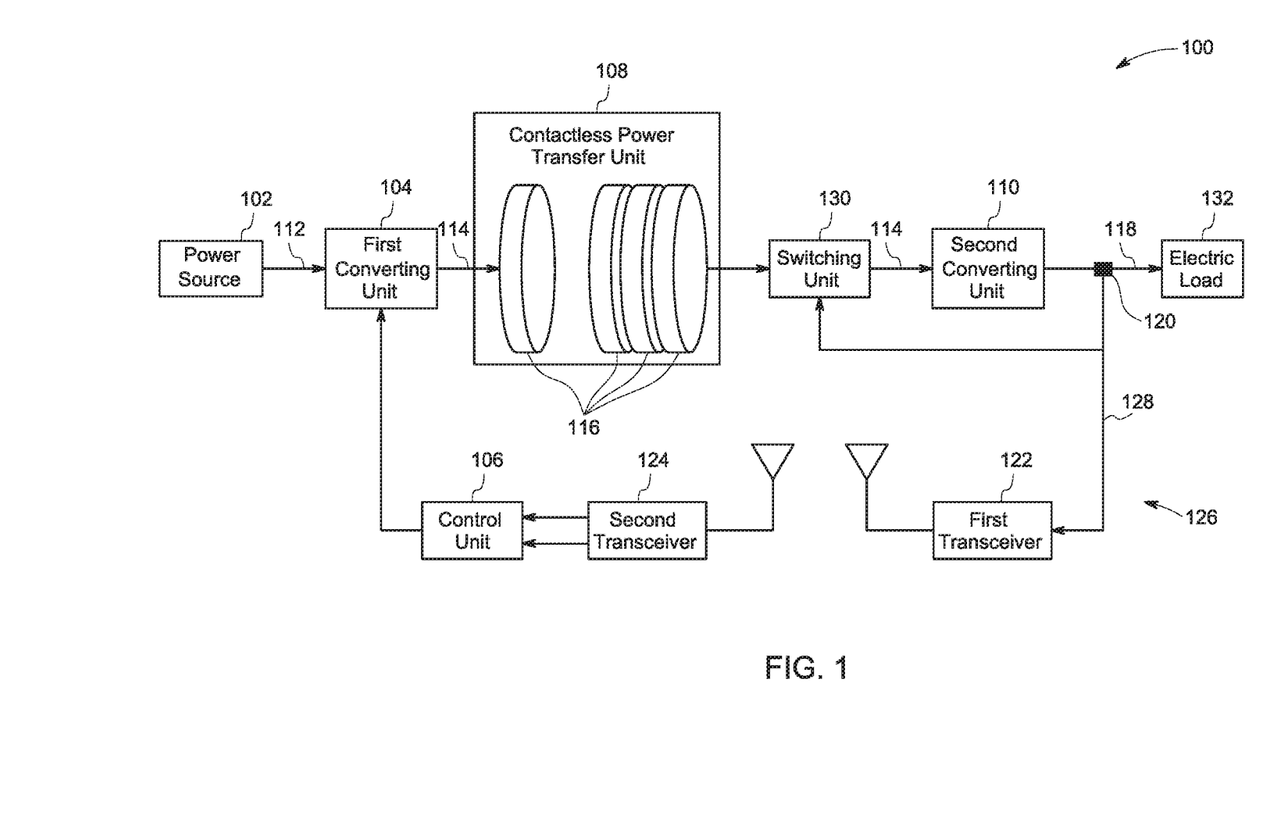
FIG. 1 is a block diagram representation of a wireless power transfer system having a switching unit in accordance with an embodiment.

FIG. 1 is a diagrammatical representation of a wireless power transfer system 100 in accordance with an embodiment of the present disclosure. The wireless power transfer system 100 is used to transmit an electrical power from a power source 102 to one or more electric loads 132 such as batteries, mobile devices such as cell phones, laptops, HVAC systems, and the like. Particularly, in an automobile industry, an electric vehicle or a hybrid vehicle includes one or more batteries that supply electrical power to drive the vehicle. Such batteries may be electrically charged from the power source 102 via the wireless power transfer system 100. In one embodiment, the wireless power transfer system 100 may also be referred to as a contactless power transfer system.

In the illustrated embodiment, the wireless power transfer system 100 includes a first converting unit 104 (inverter), a control unit 106, a contactless power transfer unit 108, and a second converting unit 110 (rectifier). The first converting unit 104 is electrically coupled to the power source 102 and the control unit 106. The power source 102 is configured to supply an input power having a first DC voltage 112 to the first converting unit 104. In some embodiments, the input power may be in a range from about 100 W to about 6.6 kW. In one embodiment, the power source 102 may be a part of the wireless power transfer system 100. In another embodiment, the power source 102 may be positioned external to the wireless power transfer system 100.

The first converting unit 104 is configured to receive the input power having the first DC voltage 112 from the power source 102. Further, the first converting unit 104 is configured to operate at a determined switching frequency to convert the first DC voltage 112 of the input power to an AC voltage 114. Particularly, the control unit 106 may determine the switching frequency of the first converting unit 104 based on the electric load 132. In one embodiment, the control unit 106 may include a digital circuit or a processor that performs one or more functions based on pre-stored instructions or programs. Upon converting the first DC voltage 112 of the input power to the AC voltage 114, the first converting unit 104 is further configured to transmit the input power having the AC voltage 114 to the contactless power transfer unit 108.

The contactless power transfer unit 108 includes two or more coils or an array of coils 116 that are magnetically coupled to each other. The coils 116 are used for wirelessly transmitting the input power having the AC voltage 114 from the first converting unit 104 to the second converting unit 110. The details pertaining to transmitting the power using the coils 116 are explained in greater detail below with reference to FIG. 2.

The second converting unit 110 is electrically coupled to the contactless power transfer unit 108 via a switching unit 130. Upon receiving the power having the AC voltage 114 from the contactless power transfer unit 108, the second converting unit 110 is configured to convert the AC voltage 114 of the input power to a second DC voltage 118. Further, the second converting unit 110 is configured to transmit the input power having the second DC voltage 118 to the electric load 132. In one embodiment, the input power having the second DC voltage may be used for charging the electric load including one or more batteries that are coupled to the wireless power transfer system 100.

Additionally, the wireless power transfer system 100 includes a voltage sensor 120, a first transceiver 122, and a second transceiver 124 that together form a feedback loop 126. The voltage sensor 120 is used to sense the second DC voltage (output voltage) 118. The feedback loop 126 is used to transmit a voltage signal ($V_o$) 128 representative of the second DC voltage 118 from the voltage sensor 120 to the control unit 106 via the first transceiver 122 and the second transceiver 124. Further, the control unit 106 is used to adjust the switching frequency of the first converting unit 104 based on the received voltage signal ($V_o$) 128 to control or regulate the second DC voltage 118 across the electric load 132.

However, since the voltage signal ($V_o$) 128 is communicated using a wireless communication path between the first transceiver 122 and the second transceiver 124, the control unit 106 may receive the voltage signal ($V_o$) 128 after a certain time delay. In one embodiment, the delay may be in a range from about 1 millisecond to about 5 milliseconds. In such a scenario, the control unit 106 may not be able to timely control the second DC voltage 118 across the electric load 132 due to the delay in communicating the voltage signal ($V_o$) 128. As a result, the second DC voltage 118 may increase above a critical value, which in turn may affect the second converting unit 110 and/or other components in the wireless power transfer system 100. The critical value may be a voltage value above which the components in the wireless power transfer system 100 may be affected. In one embodiment, the critical value may be in a range from about 400V to about 500V.

Figure 2:
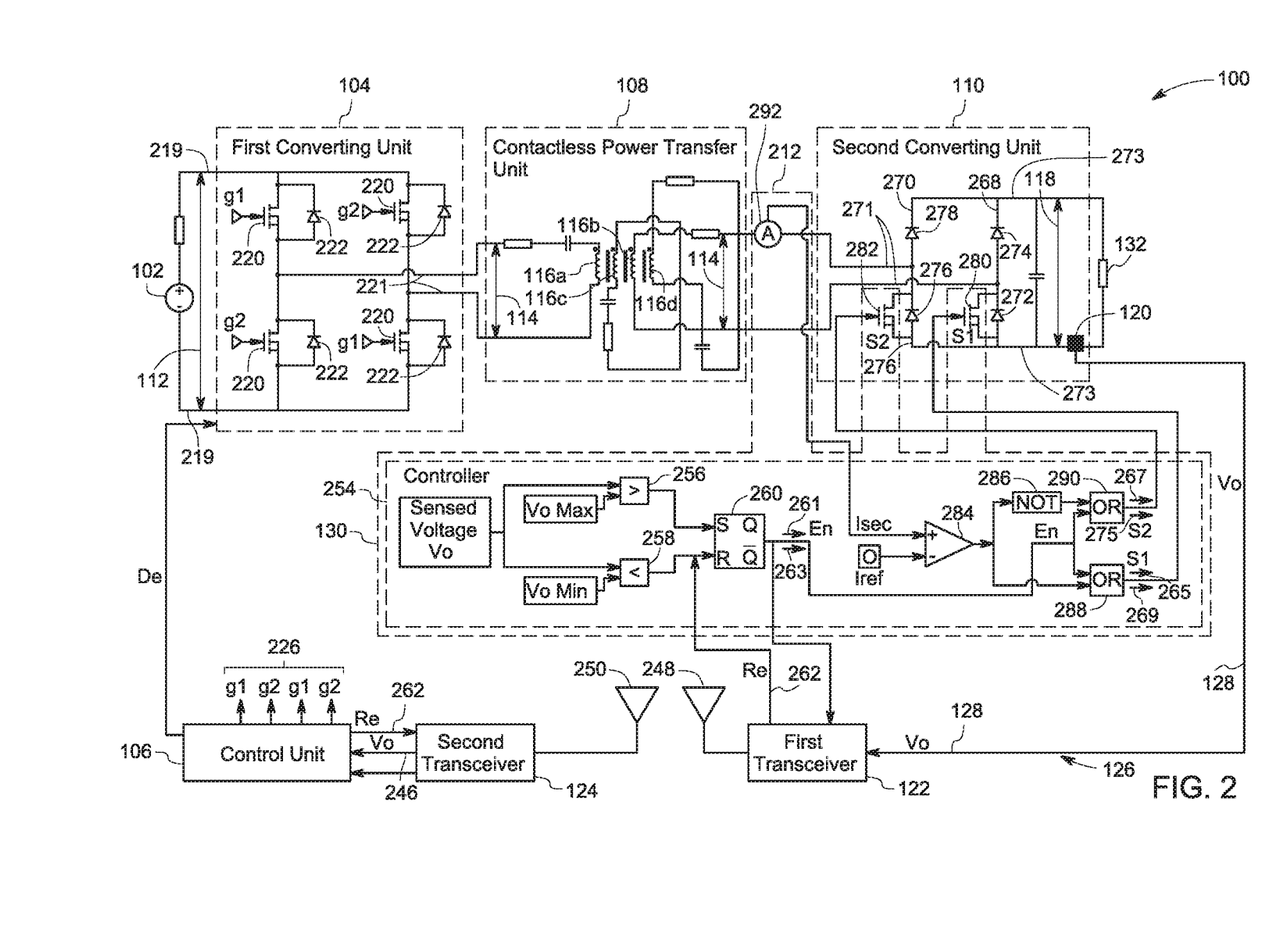
FIG. 2 is a schematic representation of a wireless power transfer system in accordance with an embodiment.

To overcome the issues related to increase of the second DC voltage 118 above a critical value, the exemplary wireless power transfer system 100 includes the switching unit 130 to protect the second converting unit 110 or other components in the wireless power transfer system 100 from being affected. Particularly, the switching unit 130 is electrically coupled to the contactless power transfer unit 108 and the second converting unit 110. The switching unit 130 is configured to decouple the electric load 132 from the contactless power transfer unit 108 if the second DC voltage 118 is greater than a first threshold value ($V_o$Max). The first threshold value ($V_o$Max) is less than the critical value. In one embodiment, the first threshold value ($V_o$Max) may be in a range from about 300V to about 400V.

The input power is not transmitted to the electric load 132 by decoupling the electric load 132 from the contactless power transfer unit 108. As a result, the second DC voltage 118 across the electric load 132 is reduced to less than the first threshold value ($V_o$Max). The protection of the second converting unit 110 is described in greater detail with reference to FIG. 2.

Furthermore, in one embodiment, the switching unit 130 may be used to regulate or control the second DC voltage 118 across the electric load 132. If a difference between the second DC voltage 118 and a voltage reference value ($V_o$ref) is above a predefined value, the switching unit 130 is configured to regulate or control the second DC voltage 118 without decoupling the electric load 132 from the contactless power transfer unit 108. Such a regulation of the second DC voltage 118 is described in greater detail with reference to FIG. 3.

Referring to FIG. 2, a schematic representation of the wireless power transfer system 100 in accordance with an embodiment of the present disclosure is depicted. The first converting unit 104 includes a plurality of switches 220 and diodes 222 that are electrically coupled between an input terminal 219 and an output terminal 221. In one embodiment, the switches 220 may include electronic switches, such as MOSFETs or IGBTs. The switches 220 are activated and deactivated based on a switching frequency of the first converting unit 104 to convert the first DC voltage 112 of the input power to the AC voltage 114. Particularly, the control unit 106 is configured to determine the switching frequency of the first converting unit 104 based on the electric load 132. Further, the control unit 106 is configured to send one or more gate signals 226 that are representative of the switching frequency to the plurality of switches 220 to convert the first DC voltage 112 of the input power to the AC voltage 114. The input power having the AC voltage 114 is transmitted from the first converting unit 104 to the contactless power transfer unit 108.

The contactless power transfer unit 108 includes a primary coil 116a and a secondary coil 116b. The primary coil 116a is electrically coupled to the first converting unit 104. The secondary coil 116b is electrically coupled to the second converting unit 110. The primary coil 116a and the secondary coil 116b are magnetically coupled to each other.

In addition to the primary coil 116a and the secondary coil 116b, the contactless power transfer unit 108 includes a field focusing coil 116c and a compensation coil 116d. The field focusing coil 116c is positioned between the primary coil 116a and the secondary coil 116b. The field focusing coil 116c is magnetically coupled to the primary coil 116a and the secondary coil 116b. The compensation coil 116d is magnetically coupled to the secondary coil 116b.

The input power having the AC voltage 114 is used to excite the primary coil 116a and the field focusing coil 116c simultaneously. A primary current corresponding to the AC voltage 114 flows through the primary coil 116a resulting in excitation of the primary coil 116a, which in turn generates a magnetic field that excites the field focusing coil 116c. Further, the magnetic field generated by the primary coil 116a is focused towards the secondary coil 116b via the field focusing coil 116c. The secondary coil 116b is configured to receive the magnetic field and convert the magnetic field to the input power having the AC voltage 114. When the secondary coil 116b receives the magnetic field, a secondary current corresponding to the AC voltage 114 flows through the secondary coil 116b. Further, the input power having the AC voltage 114 is then transmitted from the secondary coil 116b to the second converting unit 110.

In one embodiment, the field focusing coil 116c is electrically coupled to one or more resonators which are excited simultaneously by the input power to enhance the magnetic coupling between the primary coil 116a and the secondary coil 116b. The compensation coil 116d is configured to match an impedance of the contactless power transfer unit 108 with the second converting unit 110.

The second converting unit 110 includes a first branch 268 and a second branch 270 that are electrically coupled between the input terminal 271 and the output terminal 273. Particularly, the first branch 268 includes a pair of first diodes 272, 274 and the second branch 270 includes a pair of second diodes 276, 278. In some embodiments, the second converting unit 110 may be configured using electronic switches, such as MOSFETs, IGBTs along with diodes or without using diodes. The voltage sensor 120 is electrically coupled to the output terminal of the second converting unit 110 to determine the second DC voltage 118 across the electric load 132.

The first transceiver 122 includes an antenna 248 configured to transmit the voltage signal ($V_o$) 128 to an antenna 250 of the second transceiver 124. In one embodiment, the first transceiver 122 is positioned proximate to the electric load 132 and the second transceiver 124 is positioned proximate to the first converting unit 104 or the power source 102.

As discussed earlier, the control unit 106 is configured to determine a change in the electric load 132 based on the voltage signal ($V_o$) 128 representative of the second DC voltage 118. In response to receiving the voltage signal ($V_o$) 128, the control unit 106 is configured to determine or adjust the switching frequency of the first converting unit 104. Further, the control unit 106 is configured to send gate signals 226 that are representative of the switching frequency to the first converting unit 104 to control the AC voltage 114 of the first converting unit 104, which in turn controls the second DC voltage 118 across the electric load 132. In other words, the control unit 106 is configured to control or regulate the second DC voltage 118 of the wireless power transfer system 100 based on the voltage signal ($V_o$) 128 received via the feedback loop 126.

The switching unit 130 includes a first switch 280, a second switch 282, and a controller 254. The controller 254 is electrically coupled to the first switch 280, the second switch 282, and the sensor 120. In one embodiment, the first switch 280 and the second switch 282 may include one or more electronic switches such as MOSFETs, IGBTs, and the like.

In the illustrated embodiment, the first switch 280 is electrically coupled across the first diode 272 in the first branch 268 of the second converting unit 110. In a similar manner, the second switch 282 is electrically coupled across the second diode 276 in the second branch 270 of the second converting unit 110. If the second DC voltage 118 across the electric load 132 is greater than a first threshold value, the first switch 280 and the second switch 282 are operated in a protection mode to decouple the electric load 132 from other components in the wireless power transfer system 100. Particularly, the first switch 280 and the second switch 282 are activated to short-circuit the secondary coil 116b of the contactless power transfer unit 108. As a result, the electric load 132 is decoupled from the contactless power transfer unit 108.

If the second DC voltage 118 across the electric load 132 is less than a second threshold value, the first switch 280 and the second switch 282 are operated in a normal mode to couple the electric load 132 to the components of the wireless power transfer system 100. Particularly, the first switch 280 and the second switch 282 are activated and deactivated based on switching signals received from the controller 254 to couple the electric load 132 to the contactless power transfer unit 108. The first switch 280 and the second switch 282 are activated and deactivated to convert the AC voltage 114 to the second DC voltage 118. The switching signals include switching pulses corresponding to the secondary current of the contactless power transfer unit 108.

The controller 254 includes a first voltage comparator 256, a second voltage comparator 258, a flip-flop unit 260, a current comparator 284, a NOT gate 286, a first OR gate 288, and a second OR gate 290. The first comparator 256 and the second comparator 258 are electrically coupled to an input terminal of the flip-flop unit 260. Further, an output terminal of the flip-flop unit 260 is coupled to input terminals of the first OR gate 288 and the second OR gate 290.

An input terminal of the current comparator 284 is electrically coupled to a current sensor 292 that is coupled to the secondary coil 116*b* of the contactless power transfer unit 108. The current sensor 292 is used to sense the secondary current of the contactless power transfer unit 108 and transmit a current signal to the current comparator 284. Further, an output terminal of the current comparator 284 is directly coupled to the input terminal of the first OR gate 288. The output terminal of the current comparator 284 is coupled to the input terminal of the second OR gate 290 via the NOT gate 286. Further, an output terminal of the first OR gate 288 is coupled to the first switch 280 and an output terminal of the second OR gate 290 is coupled to the second switch 282.

Specifically, the controller 254 is configured to receive the voltage signal ($V_o$) 128 that is representative of the second DC voltage 118 from the sensor 120. Further, the received voltage signal ($V_o$) 128 is transmitted to the first comparator 256 and the second comparator 258. The first comparator 256 is configured to compare the second DC voltage 118 with a first threshold value ($V_o$Max). If the second DC voltage 118 is greater than the first threshold value ($V_o$Max), the first comparator 256 is configured to trigger the flip-flop unit 260 to generate a first control signal 261 at the output terminal of the flip-flop unit 260. In one embodiment, the first control signal 261 is representative of binary '1'. Further, the first control signal 261 is transmitted to the first OR gate 288 to generate a first switching signal 265. The first control signal 261 is transmitted to the second OR gate 290 to generate a second switching signal 267. In this scenario, the first OR gate 288 and the second OR gate 290 generates the first and second switching signals 265, 267 to operate the first and second switches 280, 282 in the protection mode. Particularly, if the flip-flop unit 260 generates the first control signal 261, the first OR gate 288 generates the first switching signal 265 that is same as the first control signal 261. Concurrently, the second OR gate 290 generates the second switching signal 267 that is same as the first control signal 261. In one embodiment, the first and second switching signals 265, 267 are representative of binary '1'. Further, the first switching signal 265 is transmitted to the first switch 280 to activate the first switch 280, and the second switching signal 267 is transmitted to the second switch 282 to activate the second switch 282. By activating the first switch 280 and the second switch 282, the secondary coil 116*b* of the contactless power transfer unit 108 is short-circuited. As a result, the electric load 132 is decoupled from the contactless power transfer unit 108. Further, second DC voltage 118 across the electric load 132 is reduced to below the first threshold value.

Furthermore, the second comparator 258 is configured to receive the voltage signal ($V_o$) 128 that is representative of the second DC voltage 118. The second comparator 258 is configured to compare the received second DC voltage 118 with a second threshold value ($V_o$Min). It should be noted herein that the second threshold value ($V_o$Min) is less than the first threshold value ($V_o$Max). If the second DC voltage 118 is less than the second threshold value ($V_o$Min), the second comparator 258 is configured to trigger the flip-flop unit 260 to generate a second control signal 263 at the output terminal of the flip-flop unit 260. In one embodiment, the second control signal 263 is representative of binary '0'. Further, the second control signal 263 is transmitted to the first OR gate 288 and the second OR gate 290. The first OR gate 288 and the second OR gate 290 generates switching signals to operate the first and second switches 280, 282 in the normal mode. In one embodiment, the switching signals are generated based on the secondary current of the contactless power transfer unit 108. More specifically, the current comparator 284 compares the secondary current of the contactless power transfer unit 108 with a zero value to trigger the first OR gate 288 to generate a third switching signal 269 and the second OR gate 290 to generate a fourth switching signal 275. The third switching signal 269 and the fourth switching signal 275 are complimentary to each other. The third switching signal 269 and the fourth switching signal 275 include switching pulses that correspond to the secondary current of the contactless power transfer unit 108. Further, the third switching signal 269 is transmitted to the first switch 280 and the fourth switching signal 275 is transmitted to the second switch 282 to convert the AC voltage 114 of the input power to the second DC voltage 118.

During normal operation of the wireless power transfer system 100, the first switch 280 and the second switch 282 are activated and deactivated based on the third and fourth switching signals 269, 275 to couple the electric load 132 to the contactless power transfer unit 208 and convert the AC voltage 114 of the input power to the second DC voltage 118. At this stage, the controller 254 sends the third and fourth switching signals 269, 275 to operate the first and second switches 280, 282 in the normal mode.

In certain situations, if the full load 132 or a portion of the load 132 is disconnected or decoupled suddenly from the second converting unit 110, the second DC voltage 118 across the load 132 may increase above the first threshold value ($V_o$Max). The sensor 120 determines and sends the voltage signal ($V_o$) 128 that is representative of this second DC voltage 118 to the controller 254 and the first transceiver 122. The first comparator 256 compares the second DC voltage 118 with the first threshold value ($V_o$Max). If the second DC voltage 118 is greater than the first threshold value ($V_o$Max), the first comparator 256 triggers the flip-flop unit 260 to generate the first control signal 261 which is transmitted to the first OR gate 288 and the second OR gate 290 to generate the first switching signal 265 and the second switching signal 267. Further, the first and second switching signals 265, 267 are transmitted to activate the first and second switches 280, 282. As a result, the electric load 132 is decoupled from the contactless power transfer unit 108.

Concurrently, the first control signal 261 is transmitted from the controller 254 to the first transceiver 122. Further, the first transceiver 122 transmits the voltage signal ($V_o$) 128 received from the sensor 120 and the first control signal 261 received from the controller 254 to the second transceiver 124. The voltage signal ($V_o$) 128 and the first control signal 261 are further transmitted to the control unit 106.

Upon receiving the voltage signal ($V_o$) 128 and the first control signal 261, the control unit 106 determines that the first and second switches 280, 282 are activated. As a result, the control unit 106 deactivates the first converting unit 104. Specifically, the control unit 106 sends the gate signals 226 to the switches 220 to deactivate or open the switches 220. As a result, the first converting unit 104 is deactivated from transmitting the power to the contactless power transfer unit 108 and the second converting unit 110.

Furthermore, after a predetermined time period, the control unit 106 sends a reset signal 262 to the second transceiver 124, which is further transmitted to the first transceiver 122. The first transceiver 122 sends the reset signal 262 to the flip-flop unit 260. In response to receiving the reset signal 262, the flip-flop unit 260 resets and generates the second control signal 263 at the output terminal of the controller 254. The generated second control signal 263 is further transmitted to the first OR gate 288 and the second OR gate 290 to generate the third switching signal 269 and the fourth switching signal 275 that include switching pulses corresponding to the secondary current of the contactless power transfer unit 108. Further, the third and fourth switching signals 269, 275 are transmitted to the first and second switches 280, 282 to convert the AC voltage 114 of the input power to the second DC voltage 118. The electric load 132 is coupled to the contactless power transfer unit 108 via the second converting unit 110 to receive the converted second DC voltage 118.

Concurrently, the generated second control signal 263 is transmitted from the controller 254 to the first transceiver 122. In addition to the second control signal 263, the first transceiver 122 receives the voltage signal ($V_o$) 128 representative of the second DC voltage 118 across the load 132. Further, the first transceiver 122 transmits the voltage signal ($V_o$) 128 and the second control signal 263 to the second transceiver 124, which is further transmitted to the control unit 106.

Upon receiving the voltage signal ($V_o$) 128 and the second control signal 263 from the second transceiver 124, the control unit 106 determines whether the second DC voltage 118 is less than or equal to the first threshold value ($V_o$Max). If the second DC voltage 118 is less than or equal to the first threshold value ($V_o$Max), the control unit 106 sends the gate signals 226 to the switches 220 to activate the first converting unit 104. Further, the control unit 206 adjusts the switching frequency of the first converting unit 104 based on the second DC voltage 118 across the electric load 132. In one embodiment, the control unit 106 adjusts the switching frequency of the first converting unit 104 to regulate the second DC voltage 118 across the electric load 132. If the second DC voltage 118 is greater than the first threshold value ($V_o$Max), the control unit 106 waits for the predetermined time period to send another reset signal to the controller 254. If the second DC voltage 118 continues to be greater than the first threshold value ($V_o$Max) after transmitting a determined number of reset signals, the control unit 106 deactivates the electric load 132 from the contactless power transfer unit 108. In one embodiment, the control unit 106 may shut down or deactivate the power transfer system.

Accordingly, by employing the switching unit 130 and the control unit 106, the second DC voltage 118 is prevented from increasing to greater than the critical value. As a result, the second converting unit 110 is protected from damage even if the electric load 132 is decoupled from the contactless power transfer unit 108.

Figure 3:
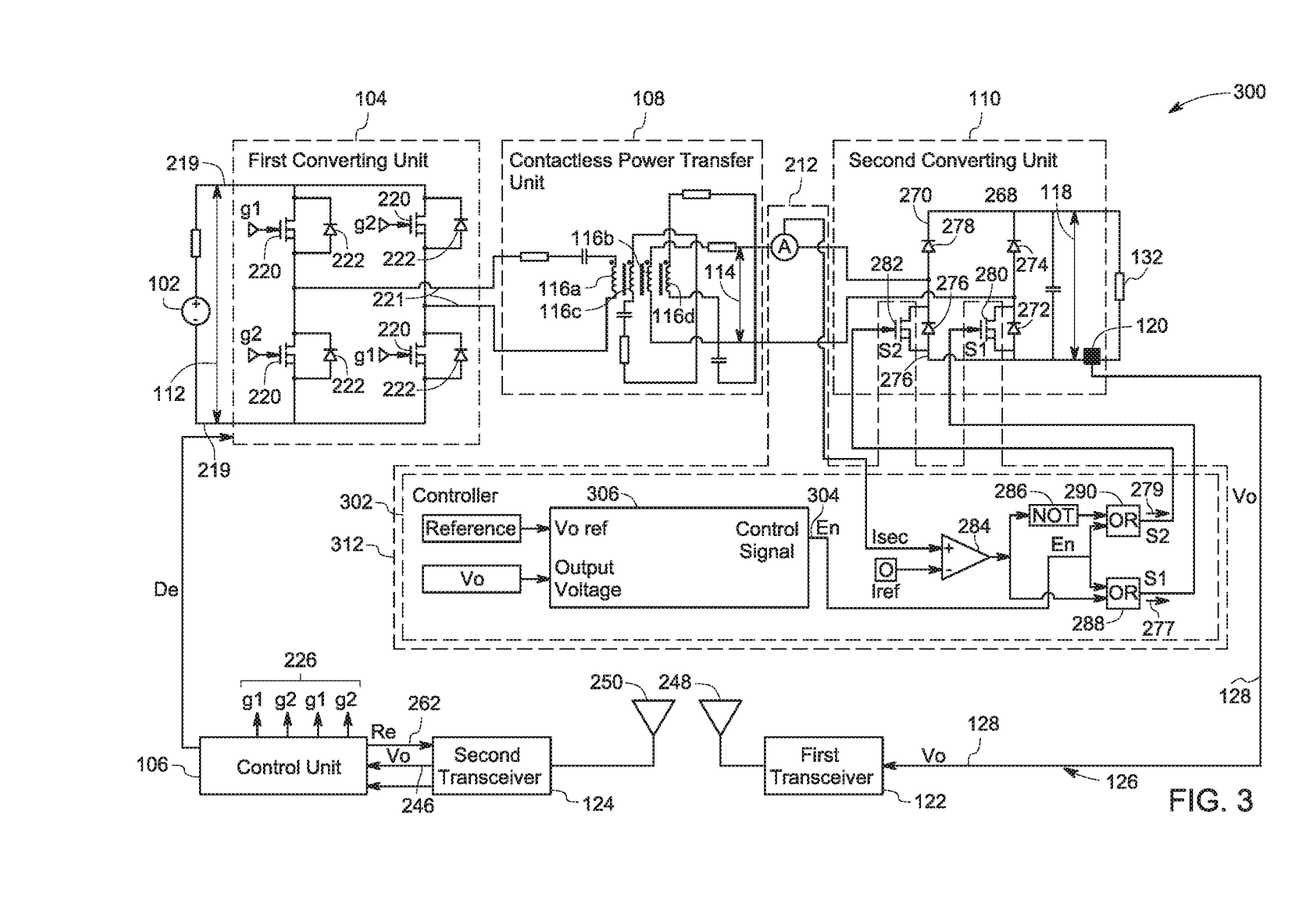
FIG. 3 is a schematic representation of a wireless power transfer system in accordance with another embodiment.

Referring to FIG. 3, a schematic representation of a wireless power transfer system 300 in accordance with another embodiment of the present disclosure is depicted. The wireless power transfer system 300 is similar to the wireless power transfer system 100 of FIG. 2 except that a controller 302 of a switching unit 312 is configured to regulate or control the second DC voltage 118 (output voltage) of the second converting unit 110.

During operation, the second DC voltage 118 across the electric load 132 may vary substantially from a voltage reference value ($V_o$ref). In one example, the second DC voltage 118 may increase or decrease below the voltage reference value ($V_o$ref). In certain scenario, due to change in the electric load 132, difference between the second DC voltage 118 and the voltage reference value ($V_o$ref) may increase above a predefined value. As a consequence, one or more components in the second converting unit 110 may be affected or damaged. Thus, it is required to control or regulate the second DC voltage 118 so that the second DC voltage 118 is maintained below a critical value. In one example, the voltage reference value ($V_o$ref) is less than the critical value.

The sensor 120 transmits the voltage signal ($V_o$) 128 representative of the second DC voltage 118 to the controller 302. A voltage comparator 306 of the controller 302 is configured to compare the second DC voltage 118 with the voltage reference value ($V_o$ref). If a difference between the second DC voltage 118 and the voltage reference value ($V_o$ref) is above the predefined value, the voltage comparator 306 generates a third control signal 304 having a determined duty cycle at an output terminal. In one embodiment, the controller 302 may determine or select the duty cycle using a look-up table. For example, if the second DC voltage 118 is 90 volts, a duty cycle of 0.75 is selected from the look-up table. In another example, if the second DC voltage 118 is 170 volts, a duty cycle of 0.5 is selected from the look-up table. In yet another example, if the second DC voltage 118 is 250 volts, a duty cycle of 0.25 is selected from the look-up table. The third control signal 304 includes switching pulses corresponding to the determined duty cycle.

The voltage comparator 306 transmits the third control signal 304 having the determined duty cycle to the first OR gate 288 and the second OR gate 290. Concurrently, the current comparator 284 transmits signals corresponding to the secondary current to the first OR gate 288 and the second OR gate 290. The first OR gate 288 generates the fifth switching signal 277 and the second OR gate 290 generates the sixth switching signal 279 based on the third control signal 304 and the secondary current of the contactless power transmitting unit 108. The fifth switching signal 277 and the sixth switching signal 279 are complimentary to each other. The fifth switching signal 277 and the sixth switching signal 279 include switching pulses corresponding to the third control signal 304 and the secondary current of the contactless power transfer unit 108. Further, the fifth switching signal 277 is transmitted to the first switch 280 and the sixth switching signal 279 is transmitted to the second switch 282 to regulate the second DC voltage 118 across the load 132.

More particularly, if the difference between the second DC voltage 118 and the voltage reference value ($V_o$ref) is greater than the predefined value, the fifth switching signal 277 and the sixth switching signal 279 are transmitted to first switch 280 and the second switch 282 respectively, to activate and deactivate the first and second switches 280, 282. The fifth and sixth switching signals 277, 279 include switching pulses corresponding to the switching pulses of the third control signal 304. As a result, the difference between the second DC voltage 118 and the voltage reference value ($V_o$ref) is reduced below the predefined value.

Further, if the difference between the second DC voltage 118 and the voltage reference value ($V_o$ref) is less than the predefined value, the fifth switching signal 277 and the sixth switching signal 279 are transmitted to the first and second switches 280, 282 to activate and deactivate the first and second switches 280, 282. The fifth and sixth switching signals 277, 279 include switching pulses corresponding to the secondary current of the contactless power transfer unit 108. As a result, the second converting unit 210 converts the AC voltage 114 of the input power to the second DC voltage 118 and supplies the converted second DC voltage 118 to the electric load 132.

Concurrently, the voltage signal ($V_o$) 128 is transmitted from the sensor 120 to the first transceiver 122. Further, the first transceiver 122 transmits the voltage signal ($V_o$) 128 to the second transceiver 124, which in turn is transmitted to the control unit 206.

The control unit 106 generates gate signals 226 based on the second DC voltage 118. Further, the control unit 106 transmits the gate signals 226 to the switches 220 to adjust the switching frequency of the first converting unit 104. As a result, the AC voltage 114 is regulated, which in turn controls the second DC voltage 118 across the load 132. However, the regulation of the second DC voltage 118, using the control unit 106, occurs after the regulation of the second DC voltage, using the controller 302. Hence, the controller 302 performs faster regulation of the second DC voltage 118 compared to the regulation of the second DC voltage 118 by the control unit 106.

Figure 4:
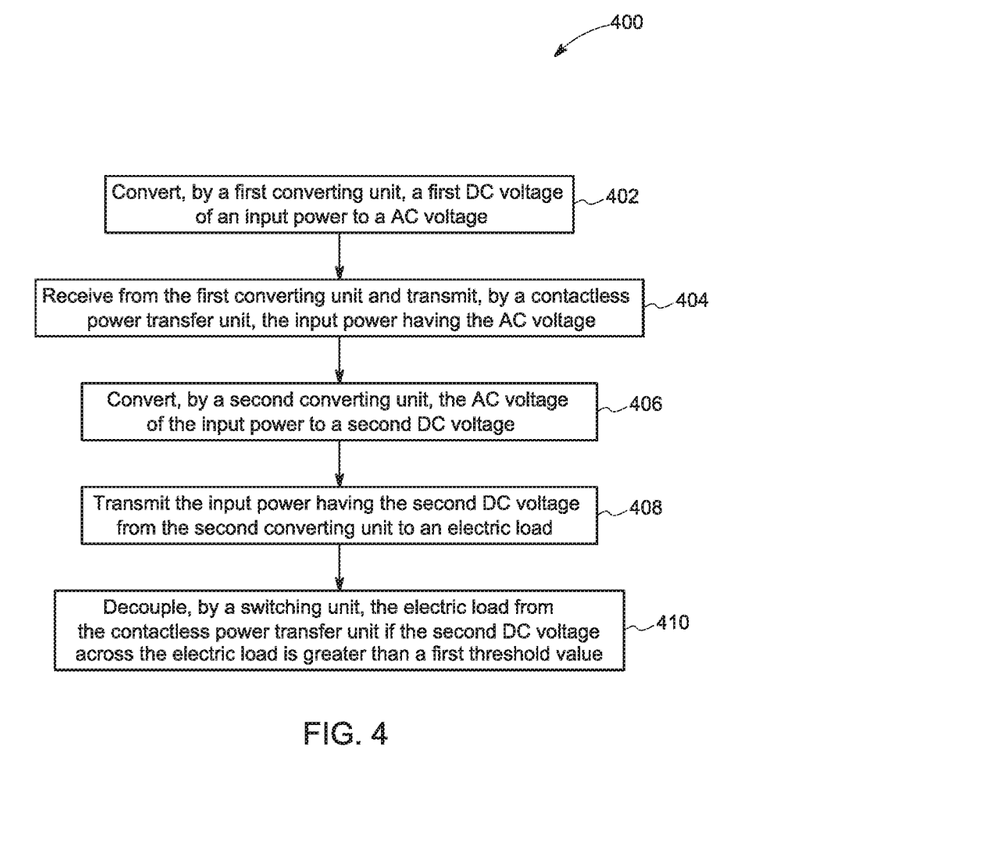
FIG. 4 is a flow chart illustrating a method for protecting a wireless power transfer system in accordance with an embodiment.

Referring to FIG. 4, a flow chart illustrating a method 400 for protecting the wireless power transfer system in accordance with an embodiment of the present disclosure is depicted. At step 402, a first DC voltage of an input power is converted to an AC voltage by a first converting unit. The first converting unit is operated at a determined switching frequency to convert the first DC voltage of the input power to the AC voltage.

Subsequently, at step 404, the method includes receiving and transmitting the input power having the AC voltage by a contactless power transfer unit. The contactless power transfer unit transmits the input power having the first AC voltage to a second converting unit. Further, at step 406, the AC voltage of the input power is converted to a second DC voltage by a second converting unit. At step 408, the input power having the second DC voltage is transmitted from the second converting unit to an electric load. In one embodiment, the electric load may be one or more batteries that are electrically charged using the input power having the second DC voltage received from the second converting unit.

At step 410, the electric load is decoupled from the contactless power transfer unit if the second DC voltage across the electric load is greater than a first threshold value ($V_o$Max). Specifically, a switching unit is used to decouple the electric load from the contactless power transfer unit. As a result, the second DC voltage across the electric load is reduced to less than the first threshold value ($V_o$Max), thereby protecting the second converting unit from being affected due to over voltage. If the determined second DC voltage is less than a second threshold value ($V_o$Min), the switching unit couples the electric load to the contactless power transfer unit to continue supplying power having the second DC voltage to the electric load.

Figure 5:
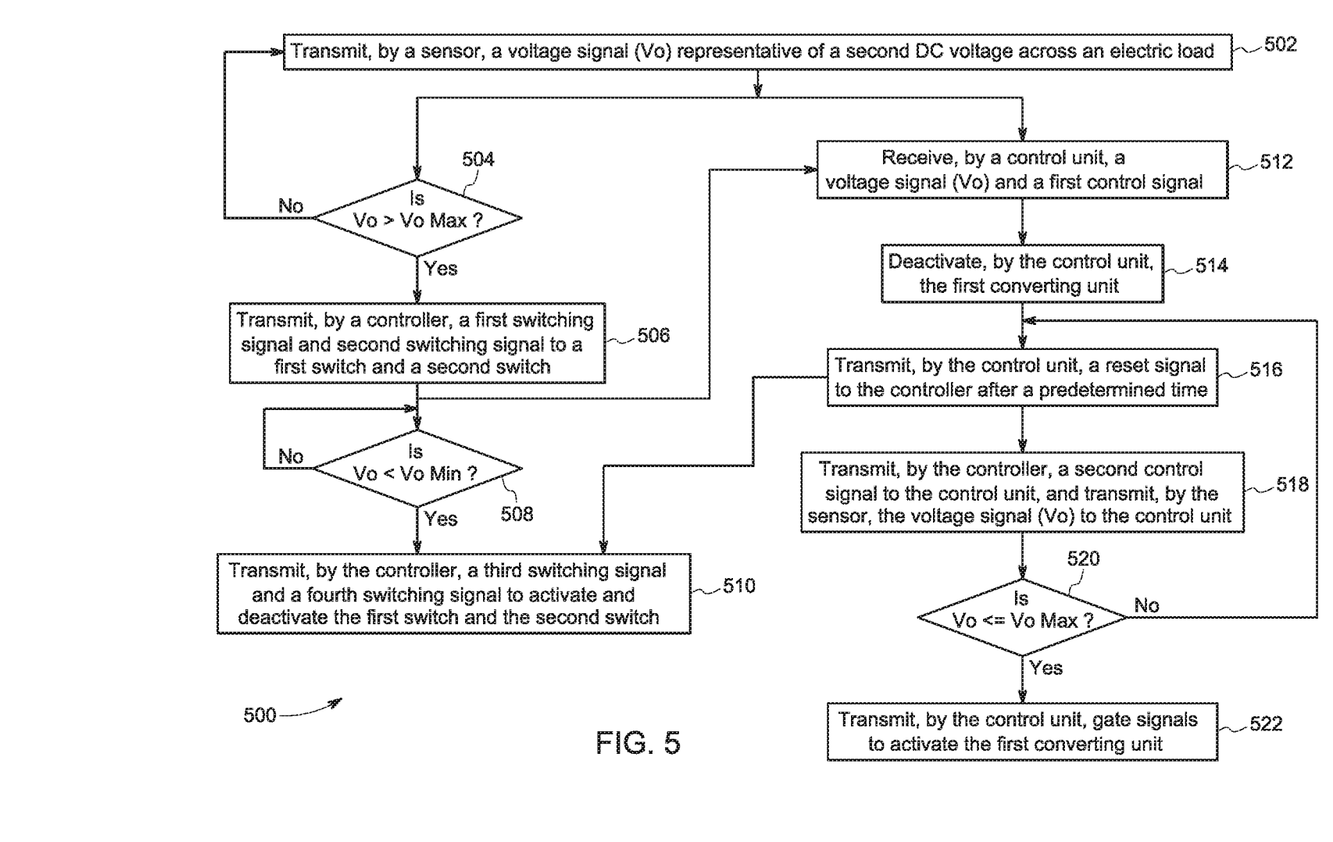
FIG. 5 is a flow chart illustrating a method for decoupling and coupling a converting unit in a wireless power transfer system in accordance with an embodiment.

Referring to FIG. 5, a flow chart illustration a method for decoupling and coupling a second converting unit in a wireless power transfer system in accordance with an embodiment of the present disclosure is depicted. At step 502, a voltage signal ($V_o$) representative of a second DC voltage across an electric load is transmitted by a sensor. More specifically, the sensor transmits the voltage signal ($V_o$) to a controller of a switching unit. Further, the sensor transmits the voltage signal ($V_o$) to a control unit via a first transceiver and a second transceiver.

At step 504, the controller determines whether the voltage signal ($V_o$) representative of the second DC voltage is greater than a first threshold value ($V_o$Max). If the voltage signal ($V_o$) representative of the second DC voltage is greater than the first threshold value ($V_o$Max), the controller transmits a first switching signal to a first switch and a second switching signal to a second switch to activate or close the first and second switches as depicted in step 506. As a result, the electric load is decoupled from the contactless power transfer unit and thereby the second DC voltage across the load is reduced to less than the first threshold value ($V_o$Max). More specifically, the second DC voltage is prevented from attaining a critical value that is greater than the first threshold value ($V_o$Max). The critical value is a voltage value greater than which the second converting unit may be affected. Concurrently, the controller sends a first control signal to the control unit via the first transceiver and the second transceiver.

At step 508, the controller determines whether the voltage signal ($V_o$) representative of the second DC voltage is less than a second threshold value ($V_o$Min). If the voltage signal ($V_o$) representative of the second DC voltage is less than the second threshold value ($V_o$Min), the controller sends a third switching signal to the first switch and a fourth switching signal to the second switch to activate and deactivate the first and second switches. As a result, the electric load is coupled to the contactless power transfer unit and the AC voltage is converted to the second DC voltage which is supplied to the electric load as depicted in step 510.

At step 512, the control unit receives the voltage signal ($V_o$) and the first control signal. Specifically, the control unit receives the voltage signal ($V_o$) from the sensor via the first transceiver and the second transceiver. The control unit receives the first control signal from the controller via the first transceiver and the second transceiver.

At step 514, the control unit deactivates the first converting unit if the first control signal is received from the controller. The first converting unit is deactivated to prevent the supply of input power to the second converting unit. At step 516, the control unit transmits a reset signal to the controller via the first transceiver and the second transceiver after a predetermined time period. In response to receiving the reset signal, the controller generates the third and fourth switching signals. Further, the controller sends the third and fourth switching signals to operate the first and second switches in the normal mode. As a result, the electric load is coupled to the contactless power transfer unit to receive the power via the second converting unit.

Concurrently, at step 518, the controller transmits the second control signal to the control unit via the first transceiver and the second transceiver. Further, at step 518, the sensor transmits the voltage signal ($V_o$) to the control unit via the first transceiver and the second transceiver. At step 520, the control unit determines whether the voltage signal ($V_o$) representative of the second DC voltage is less than or equal to the first threshold value ($V_o$Max). If the second DC voltage is less than or equal to the first threshold value ($V_o$Max), the control unit transmits gate signals to activate the first converting unit. As a result, the input power is supplied to the second converting unit via the contactless power transfer unit. Further, the electric load receives the power having the second DC voltage from the second converting unit. As a result, one or more components in the wireless power transfer unit are protected from increase in the second DC voltage across the load. On the other hand, if the second DC voltage is still greater than the first threshold value ($V_o$Max), the control unit continues to deactivate the first converting unit and sends another reset signal after the predetermined time period to verify whether the second DC voltage is less than or equal to the first threshold value ($V_o$Max). If the second DC voltage is greater than the first threshold value ($V_o$Max) after sending a determined number of reset signals, the control unit may shut down or deactivate the power transfer system. In accordance with the exemplary embodiments discussed herein, the exemplary system and method facilitate to protect one or more components in the wireless power transfer system when the load is disconnected. Further, the exemplary system and method facilitate to control or regulate the output voltage when the load is disconnected. As a result, one or more components in the system are protected without decoupling the components from each other in the system.

Figure 6:
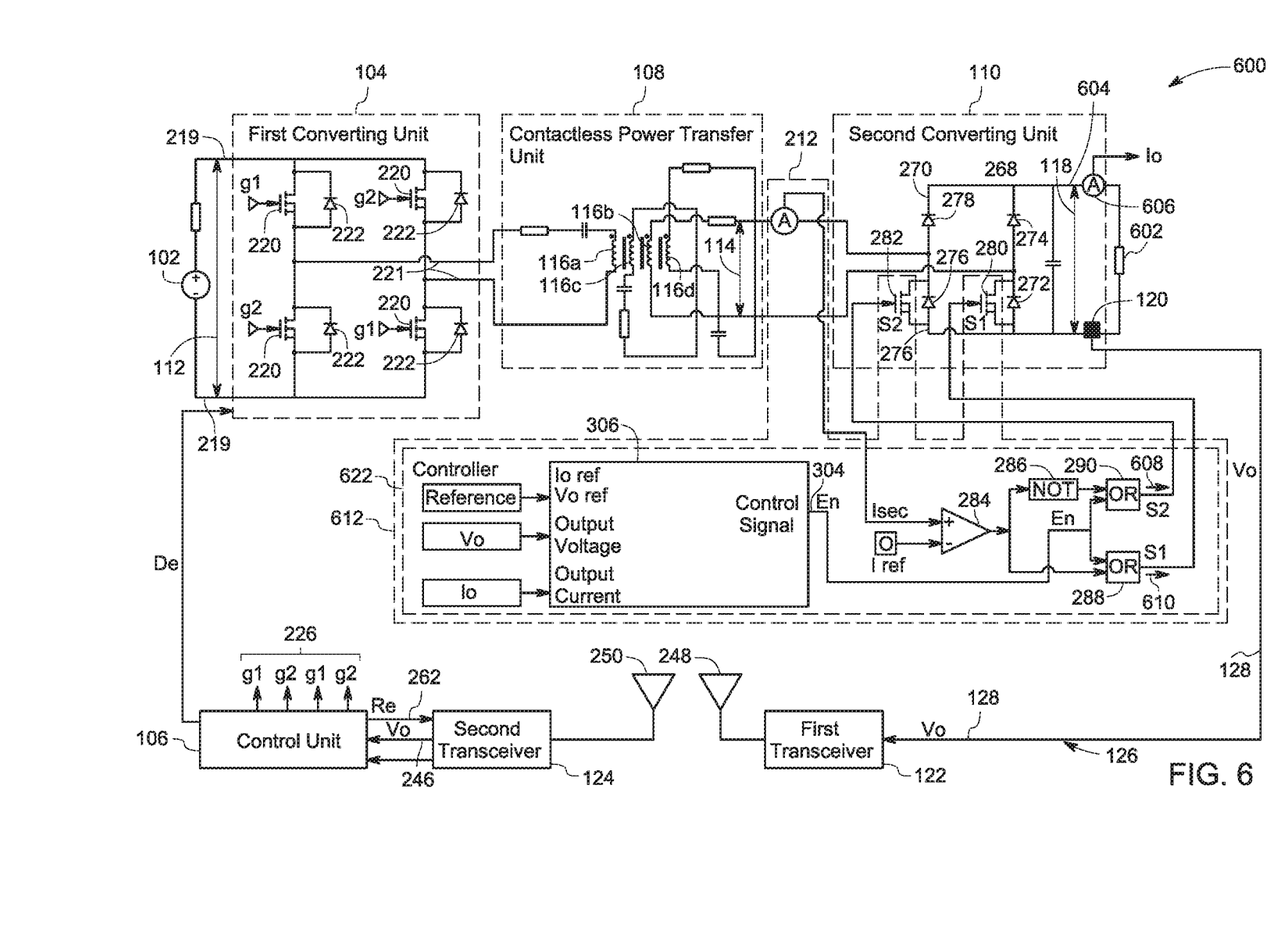
FIG. 6 is a schematic representation of a wireless power transfer system in accordance with another embodiment.

Referring to FIG. 6, a schematic representation of a wireless power transfer system 300 in accordance with one embodiment of the present disclosure is depicted. The wireless power transfer system 600 is similar to the wireless power transfer system 300 of FIG. 3 except that a controller 622 of a switching unit 612 is configured to regulate or control the second DC voltage 118 (output voltage) and electrical current 604 (output current) of the second converting unit 110. Also, in this embodiment, a battery 602 may be coupled across the second converting unit 110 as an electric load. The battery 602 may be charged by the second DC voltage 118 provided by the second converting unit 110.

In this embodiment, the controller 622 may control or regulate output current 604 provided to the battery 602 along with the second DC voltage 118 while charging the battery 602. In one example, if the battery 602 is a lead acid battery, the controller 622 may first regulate the output current 604 until the battery is charged to a predefined value. Further, the controller 622 may regulate the second DC voltage 118 until the battery is fully charged. For ease of understanding, the battery 602 is considered as the lead acid battery in the below description.

During operation, the controller 622 may monitor the output current 604 along with the second DC voltage 118 while charging the battery 602. If the electrical charge in the battery 602 is below or equal to a predetermined value, the controller 622 may control or regulate the electrical current so that a constant output current 604 is provided to the battery 602 for charging the battery 602. In one example, the predetermined value may be 80% of battery's full charge capacity. Particularly, the controller 622 may receive a signal representative of the output current 604 from a current sensor 606. Further, the controller 622 may compare the output current 604 with a current reference value (Io ref) to generate switching signals $S_1$ and $S_2$ 608. 610 having corresponding switching pulses. These switching signals $S_1$ and $S_2$ 608, 610 are provided to the switches 280, 282 to regulate the output current 604 that is used for charging the battery 602.

Furthermore, if the electrical charge in the battery 602 is above the predetermined value. The controller 622 may control or regulate the second DC voltage 118 so that a constant second DC voltage is provided for charging the battery 602. Particularly, the controller 622 may receive a signal representative of the second DC voltage 118 from the voltage sensor 120. Further, the controller 622 may compare the second DC voltage 118 with a voltage reference value ($V_o$ref) to generate switching signals $S_1$ and $S_2$ 608, 610 having corresponding switching pulses. These switching signals $S_1$ and $S_2$ 608, 610 are provided to the switches 280, 282 to regulate the second DC voltage 118 that is provided for charging the battery 602. It may be noted that the controller 622 may regulate voltage and/or current based on a type of the battery that is coupled to the second converting unit 110. In one embodiment, the controller 622 may first regulate the second DC voltage 118 until the battery is charged to the predetermined value. Further, the controller 622 may regulate the output current 604 until the battery is fully charged.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

This written description uses examples to disclose the invention, including the example embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for receiving wireless power, comprising:
a secondary coil configured to wirelessly receive an induced power from a primary coil of a contactless power transfer unit;
a converting unit configured to convert the induced power from an AC voltage to an output power having an output DC voltage and provide the output power to an electric load;
a transceiver configured to communicate a voltage signal to a corresponding transceiver of the contactless power transfer unit, the voltage signal representative of the output DC voltage across the electric load; and
a switching unit coupled in an electrical path between the secondary coil and the electric load, the switching unit configured to:
regulate the output DC voltage when the output DC voltage is above a voltage reference value and below a second threshold value, and
decouple the electric load to protect one or more components of the apparatus from over voltage damage and transmit, via the transceiver, a signal to the corresponding transceiver of the contactless power transfer unit indicating the decoupling of the electric load when the output DC voltage exceeds a first threshold value greater than the second threshold value.

2. The apparatus of claim 1, wherein the transceiver is further configured to receive a reset signal from the corresponding transceiver of the contactless power transfer unit, and wherein the reset signal causes a controller to enable supply of the output power via the converting unit to the electric load in response to processing the reset signal.

3. The apparatus of claim 1, further comprising:
a sensor electrically coupled to the electric load and configured to determine the output DC voltage across the electric load.

4. The apparatus of claim 1, further comprising:
a controller electrically coupled to the switching unit, the controller configured to control the switching unit based, at least in part, on the output DC voltage across the electric load.

5. The apparatus of claim 4, wherein the controller is configured to:
determine a duty cycle of a control signal based on the output DC voltage across the electric load; and
generate and feed the control signal to a switch of the switching unit.

6. The apparatus of claim 5, wherein the duty cycle causes the switching unit to regulate the output power.

7. The apparatus of claim 5, wherein the controller is configured to determine the duty cycle of the control signal using a look-up table that indicates the duty cycle corresponding to different output DC voltages.

8. The apparatus of claim 1, wherein the voltage signal communicated by the transceiver is communicated to cause the contactless power transfer unit to adjust a switching frequency of a transmitter-side converting unit of the contactless power transfer unit based on the voltage signal representative of the output DC voltage across the electric load.

9. The apparatus of claim 8, wherein the switching frequency of the transmitter-side converting unit controls the induced power having the AC voltage received from the primary coil.

10. The apparatus of claim 9, wherein the voltage signal communicated by the transceiver is communicated to regulate the output DC voltage across the electric load.

11. The apparatus of claim 10, wherein the switching unit of the apparatus is operable to regulate the output DC voltage across the electric load faster than the transmitter-side converting unit can be adjusted based on the voltage signal.

12. The apparatus of claim 1, wherein the switching unit is incorporated into the converting unit.

13. The apparatus of claim 1, wherein the switching unit includes at least one switch electrically coupled with at least one diode, the at least one switch operated using a duty cycle to regulate the output DC voltage.

14. The apparatus of claim 1, wherein the switching unit includes at least one switch electrically coupled with at least one diode, and wherein regulating the output power includes determining a duty cycle for the at least one switch based on the voltage reference value.

15. The apparatus of claim 1, wherein the switching unit includes at least one switch operated using a duty cycle to regulate the output DC voltage, wherein the at least one switch is coupled across the converting unit.

16. The apparatus of claim 15, wherein the at least one switch short-circuits the secondary coil when the at least one switch is activated.

17. A method performed by an apparatus of a wireless power transfer system, the method comprising:
receiving, via a secondary coil, an induced power from a primary coil of a contactless power transfer unit;
converting, by a converting unit, the induced power from an AC voltage to an output power having an output DC voltage;
providing the output power to an electric load;
communicating, by a first transceiver, a voltage signal to a second transceiver of the contactless power transfer unit, the voltage signal representative of the output DC voltage across the electric load, wherein the voltage signal is communicated to cause a control unit to adjust the AC voltage of the induced power;
regulating, using a switching unit in an electrical path between the secondary coil and the electric load, the output DC voltage when the output DC voltage is above a voltage reference value and below a second threshold value; and
decoupling the electric load, using the switching unit, to protect one or more components of the apparatus from over voltage damage and transmitting, via the first transceiver, a signal to the second transceiver of the contactless power transfer unit indicating the decoupling of the electric load when the output DC voltage exceeds a first threshold value greater than the second threshold value.

18. The method of claim 17, further comprising:
receiving, by the first transceiver, a reset signal from the second transceiver of the contactless power transfer unit, the reset signal for resetting the switching unit; and
enabling supply of the output power via the converting unit to the electric load based on the reset signal.

19. The method of claim 17, wherein regulating the output power comprises:
determining a duty cycle of a control signal based on the output DC voltage; and
generating and feeding the control signal to a switch of the switching unit.

20. The method of claim 19, wherein the duty cycle of the control signal is configured to cause the switching unit to regulate the output DC voltage across the electric load.

21. The method of claim 19, wherein determining the duty cycle of the control signal includes referring to a look-up table that indicates the duty cycle corresponding to different output DC voltages.

22. The method of claim 17, wherein the voltage signal communicated by the first transceiver is communicated to cause the contactless power transfer unit to adjust a switching frequency of a transmitter-side converting unit of the contactless power transfer unit based on the voltage signal representative of the output DC voltage across the electric load.

23. The method of claim 22, wherein the switching frequency of the transmitter-side converting unit controls the induced power having the AC voltage received from the primary coil.

24. The method of claim 17, wherein the voltage signal is communicated to regulate the output DC voltage across the electric load by causing the contactless power transfer unit to adjust the induced power.

25. The method of claim 17, wherein the switching unit of the apparatus is operable to regulate the output DC voltage across the electric load faster than a transmitter-side converting unit can be adjusted based on the voltage signal.

26. The method of claim 17, wherein the switching unit is incorporated into the converting unit.

* * * * *